United States Patent Office 2,832,680
Patented Apr. 29, 1958

2,832,680
METHOD OF DEFOLIATING PLANTS
Alvaro M. Goenaga, New York, N. Y., assignor to Diamond Alkali Company, Cleveland, Ohio, a corporation of Delaware
No Drawing. Application April 12, 1954
Serial No. 422,690
2 Claims. (Cl. 71—2.5)

This invention relates to improvements in plant treating materials, and more particularly relates to improved compositions and to methods for their use.

In recent years there has been considerable use of chemicals to defoliate various plants including, among others, cotton and soy bean. Defoliation of plants offers certain advantages, for example, in defoliated cotton, the resultant increased exposure to sun and the drying action of air movement cause mature bolls to open faster. Moreover, defoliation prevents or reduces boll rot and, in addition, retards seed and fiber deterioration.

Cotton defoliation also has the advantage of preventing difficulties heretofore caused when the cotton leaves are crushed into the cotton, thereby leaving objectionable stains. Another difficulty heretofore encountered is the problem of removing dried leaves, which are carried along to the cotton gin with the bolls.

Although the defoliation of various plants is desirable when the crop is harvested by hand, since picking becomes easier and more comfortable, defoliation is particularly advantageous when mechanical pickers or harvesters are employed. Defoliated plants are free from leaves which would otherwise clog spindles of mechanical pickers or add to the trash which must be separated from the desired plant portion being harvested. In addition, when leaves are removed, the operator of the mechanical picker has a better view of the plant to be harvested and is enabled to more easily position the machine over the plants.

Various chemical compounds have been heretofore suggested and used, in some instances on a rather large scale in the defoliation of cotton and other plants. Typical of prior defoliants are calcium cyanamid, monosodium cyanamid, potassium cyanate, sodium chlorate, sodium dichromate, pentachlorophenol, sodium pentaborate, sodium monochloroacetate, and magnesium chlorate hexathydrate. While, in many instances, these defoliants have been satisfactory in leaf removal, their use has not been a complete solution to the problem of defoliation. One of the difficulties encountered generally with prior defoliants has been a general plant tissue destruction and, in many instances, the phenomenon of leaf burning with resultant leaf and plant brittleness.

Accordingly, it is the principal object of the present invention to avoid the difficulties encountered with prior defoliant compositions and to provide a new and improved defoliant material and methods for its use.

Another object of the present invention is the provision of an improved defoliant composition which is highly specific in its action as a defoliant.

Another object is the provision of an improved plant treatment material effective both as a defoliant and as an insecticide.

A further object of this invention is the provision of highly effective defoliant compositions which may be applied in a systemic manner or directly to the plant foliage.

These and other objects and advantages of the invention will appear more fully from the description hereinafter.

As used herein, unless otherwise indicated, the term "plant" includes all portions of the plant, such as the roots, stems, leaves, fruits, seeds, and blossoms.

This invention contemplates a method of modifying the normal growth and life characteristics of a plant by contacting the plant with a composition comprising as an active ingredient a compound of the following formula:

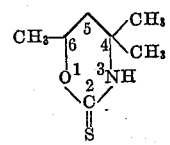

4,4,6-trimethyl-2-thio-tetrahydro-1,3-oxazine

Surprisingly, the compound of the present invention also exhibits, in addition to a singular defoliating action, excellent insecticidal properties. More particularly, this compound is effective in the control of such insects as the southern army worm and the Mexican bean beetle, both of which are typical of insect pests which attack plant foliage and cause much damage. Hence, the compound of this invention provides a unique combination of insecticidal and specific defoliant properties not found in prior plant treating materials.

By the practice of the present invention, it has been discovered that improved defoliation is obtained when a plant is treated with a liquid composition of this invention by spraying, drenching, or immersing, or with a powder composition embodying the present invention, or by applying such a composition to the soil, the defoliant action being obtained by absorption through the plant's roots and subsequent translocation through the plant circulatory system. Such latter "systemic" action is particularly advantageous in those instances where rainfall would tend to remove defoliants applied externally to the plant foliage. In any type of aplication, compositions embodying the present invention are singularly specific in their action as defoliants in causing abscission of the plant leaves from the stems.

In addition to the foregoing advantages as defoliants, compositions embodying this invention are also useful in the treatment of grain crops to harden them to maturity before frost when planted late in the season. For example, such compositions are useful in hardening to maturity an alfalfa crop planted after winter wheat of the preceding year. Another application of compositions of this invention is the treatment of nursery stock to force maturity and dormancy of the stock to provide a longer growing and harvesting season.

By way of illustrating a suitable method of preparation, an excellent yield of substanitally pure 4,4,6-trimethyl-2-thio-tetrahydro-1,3-oxazine is obtained by reacting 4-amino-4-methyl-2-pentanol with carbon disulfide in a sodium hydroxide-water medium at a temperature of about 0° to 5° C., with subsequent heating at a temperature of about 85° C.

It will be understood, of course, that in the preparation of the active compound employed in the practice of the present invention a pure compound is not necessarily isolated at each step in the process and that purification of both the intermediate and final product is generall practicable only to the extent necessary for removing by-products and impurities which otherwise would adversely affect the reaction yield or deleteriously affect the plants to which the materials are applied.

In order that those skilled in the art may better understand the practice of the present invention and in what manner it may be carried into effect, although the method of synthesis described is not to be construed as the only suitable method of preparation, the following example illustrates the preparation of the compound embodying the invention and its use:

EXAMPLE

Part A

*4,4,6-trimethyl-2-thio-tetrahydro-1,3-oxazine.* — 3 mols (120 grams) of sodium hydroxide is dissolved in 300 ml. of distilled water. The resultant solution is placed in a 1-liter, 3-necked, round-bottomed flask fitted with a stirrer, thermometer, and dropping funnel. The reaction mixture is then cooled to 5° C., at which time 0.75 mol (87.7 grams) of 4-amino-4-methyl-2-pentanol is added, together with 0.5 gram of a wetting agent, Ultra-Wet D. S. (alkyl benzene sodium sulfonate). Continuing to maintain the temperature between 0° and 5° C., 1.5 mols (114 grams) of carbon disulfide is added dropwise, with continuous stirring, over a period of 70 minutes, after which the mixture is allowed to stand for 1.5 hours to warm up to room temperature.

The reaction mixture is then heated with stirring for 8 hours at 45° C. and 6 hours at 85° C., during which time a dark-colored solid separates. The solid is collected by filtration and recrystallized once from isopropyl alcohol, using activated charcoal for decolorization. The resultant pink solid collected weighs 108 grams (91% yield) and is recrystallized three more times from isopropanol to produce a white solid, 4,4,6-trimethyl-2-thio-tetrahydro-1,3-oxazine, having a melting point range of 214.5° to 216° C.

Part B

The product of Part A is applied to bean plants at a 150 mg. dosage per plant in 4-inch diameter pots. Excellent systemic defoliation is observed, all of the leaves being removed in four days.

Part C

The product of Part A is applied, in dosages of 0.5 gram, 0.25 gram, 0.125 gram, and 0.0625 gram per 10-inch clay pot, respectively, to four cotton plants having set bolls. The application is made directly to the soil without any diluent. In less than four days the plant receiving the 0.5 gram dose drops most of its leaves and the plant receiving the 0.25 gram dose about half its leaves. In seven days both plants are completely defoliated, the bolls strongly adhering. The two plants receiving the smaller dosages begin to show defoliation in six days. These tests clearly indicate that the compound is capable of acting as a cotton defoilant at very low dosages, that it is quick acting, and that it is readily absorbed through the plant roots.

Part D

The product of Part A is formulated into a 25% wettable powder, dispersed in water at concentrations indicated below, and applied by dipping cranberry bean plants therein. After the treated plants have dried, untreated Mexican bean beetles are caged thereon. Observations are made 48 hours after treatment with the following results:

| Actual Conc'n, Percent | Insect Mortality, Percent |
|---|---|
| 1.00 | 100 |
| 0.50 | 100 |
| 0.25 | 90 |
| 0 | 0 |

It will be understood, of course, that the compound embodying the present invention may be employed either alone or with small amounts of wetting agents added.

Typical of suitable wetting agents are the following commercially available trade-name products: Igepal CO–880 (alkyl phenoxypolyoxyethylene ethanol), Arquad 2–C (quaternary ammonium compound of the formula RR'—N—(CH$_3$)$_2$Cl), Emulphor ON–870 (polyoxyethylated fatty alcohol), Tween 80 (polyoxyethylene sorbitan monooleate), Triton X–155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F–68 (condensate of ethylene oxide with an hydrophobic base formed by condensing propylene oxide with propylene glycol), Antarox A–400 (alkyl phenoxypolyoxyethylene ethanol), Triton X–120 (alkyl aryl polyether alcohol), Nacconol NRSF (alkyl aryl sulfonate), Aresol OS (isopropyl naphthalene sodium sulfonate), Span 40 (sorbitan monopalmitate), Triton B–1956 (modified phthalic glycerol alkyd resin), and Antarox B–290 (polyoxyethylated vegetable oil). At present, a preferred wetting agent is the non-ionic material Igepal CO–880 employed in an amount of about 0.1% by weight based on the amount of liquid present.

It will be understood, of course, that compounds embodying the present invention are effective when applied to plants systemically, i. e., via root absorption, or in a direct manner, as by spraying, sprinkling, or drenching the plant with a solution of the compound, or by dusting with a dry material containing a compound of the present invention as an active ingredient, or by applying a slurry containing a compound of the present invention as an active ingredient.

Although compounds embodying the present invention may be employed as wettable powders, with or without diluents and/or extenders or other modifying ingredients, including such things as insecticides or other plan treating agents, a typical application utilizes compounds of the present invention in the form of a liquid spray in a concentration of about 0.5% by weight. In such a spray material, water is, of course, a satisfactory liquid, although other liquids also may be employed.

While there have been described various embodiments of the invention, the methods and products described are not intended to be understood as limiting the scope of the invention, as it is realized that changes therewithin are possible, it being intended to cover the invention broadly in whatever form its principle may be utilized.

What is claimed is:

1. The method of defoliating plants which comprises applying thereto a material including as an active ingredient in a defoliating amount the compound having the formula

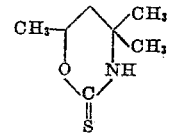

2. The method of defoliating a plant, said method comprising treating said plant with a composition comprising a finely-divided carrier, a wetting agent, and in a defoliating amount the compound having the formula

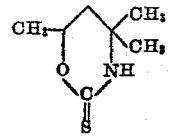

References Cited in the file of this patent

UNITED STATES PATENTS

| | | |
|---|---|---|
| 2,086,186 | Messer | July 6, 1937 |
| 2,170,059 | Mathes | Aug. 22, 1939 |
| 2,326,732 | Fisher | Aug. 10, 1943 |
| 2,547,682 | Baumgartner | Apr. 3, 1951 |
| 2,568,633 | Jansen | Sept. 18, 1951 |
| 2,651,630 | Downey | Sept. 8, 1953 |

FOREIGN PATENTS

| | | |
|---|---|---|
| 626,486 | Great Britain | July 15, 1949 |